US012659425B2

(12) United States Patent
Lagnado et al.

(10) Patent No.: US 12,659,425 B2
(45) Date of Patent: Jun. 16, 2026

(54) REMOVAL OF MOVING OBJECTS IN VIDEO CALLS

(71) Applicant: Hewlett-Packard Development Company, L.P., Spring, TX (US)

(72) Inventors: Isaac Lagnado, Spring, TX (US); Christopher Steven, Spring, TX (US); Robert Campbell, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 224 days.

(21) Appl. No.: 18/250,020

(22) PCT Filed: Oct. 22, 2020

(86) PCT No.: PCT/US2020/056892
§ 371 (c)(1),
(2) Date: Apr. 21, 2023

(87) PCT Pub. No.: WO2022/086541
PCT Pub. Date: Apr. 28, 2022

(65) Prior Publication Data
US 2023/0396733 A1 Dec. 7, 2023

(51) Int. Cl.
*H04N 7/14* (2006.01)
*G06T 7/20* (2017.01)
(Continued)

(52) U.S. Cl.
CPC .............. *H04N 7/147* (2013.01); *G06T 7/20* (2013.01); *G06T 11/60* (2013.01); *G06V 10/141* (2022.01);
(Continued)

(58) Field of Classification Search
None
See application file for complete search history.

(56) References Cited

U.S. PATENT DOCUMENTS 5,627,905 A * 5/1997 Sebok .................... H04N 23/68
                                                        348/E5.065
6,111,517 A * 8/2000 Atick ................... G06V 40/172
                                                        340/5.83
(Continued)

FOREIGN PATENT DOCUMENTS

CN          104268900 B       2/2017

OTHER PUBLICATIONS

Kido, D., et al., "Diminished reality system with the real-time object detection using deep learning for onsite landscape simulation during redevelopment", ELSEVIER, Environmental Modelling & Software, vol. 131, Jun. 10, 2020, pp. 10.
(Continued)

Primary Examiner — Duc Nguyen
Assistant Examiner — Assad Mohammed
(74) Attorney, Agent, or Firm — Quarles & Brady LLP

(57) ABSTRACT

In example implementations, an apparatus is provided. The apparatus includes a video camera to capture images, a proximity sensor to measure a distance of a moving object from the video camera, and a processor communicatively coupled to the video camera and the proximity sensor. The processor is to execute a video call application, detect the moving object within the video images transmitted by the video call application, determine that the moving object is located at a distance greater than a distance threshold, and remove the moving object from the video images transmitted by the video call application in response to the distance of the moving object being located being greater than the distance threshold.

19 Claims, 6 Drawing Sheets

(51) Int. Cl.

| | |
|---|---|
| *G06T 11/60* | (2006.01) |
| *G06V 10/141* | (2022.01) |
| *G06V 10/74* | (2022.01) |
| *G06V 40/16* | (2022.01) |

(52) U.S. Cl.
CPC .......... *G06V 10/761* (2022.01); *G06V 40/172* (2022.01); *G06V 2201/07* (2022.01)

(56) References Cited

U.S. PATENT DOCUMENTS

| | | | |
|---|---|---|---|
| 7,123,745 | B1 | 10/2006 | Lee |
| 8,401,232 | B2 | 3/2013 | Fan et al. |
| 9,478,039 | B1 * | 10/2016 | Wang ........................ G06T 7/11 |
| 9,661,272 | B1 * | 5/2017 | Daniel ................. G03H 1/0005 |
| 10,554,921 | B1 * | 2/2020 | Lim ........................ G06V 40/18 |
| 10,769,415 | B1 * | 9/2020 | Mostafa ............... G06V 10/993 |
| 2008/0290985 | A1 | 11/2008 | Vogedes et al. |
| 2012/0026277 | A1 * | 2/2012 | Malzbender .......... H04N 7/147 348/E7.083 |
| 2012/0051631 | A1 | 3/2012 | Nguyen et al. |
| 2013/0009875 | A1 * | 1/2013 | Fry ........................ G06F 3/017 345/175 |
| 2013/0268476 | A1 | 10/2013 | Sankarasubramniam et al. |
| 2014/0099021 | A1 | 4/2014 | Bian et al. |
| 2014/0118240 | A1 * | 5/2014 | Pais ......................... G09G 3/00 345/698 |
| 2014/0368456 | A1 * | 12/2014 | Sakai .................... G06F 3/0481 345/173 |
| 2015/0205997 | A1 | 7/2015 | Ma et al. |
| 2018/0249113 | A1 * | 8/2018 | Faulkner .............. G11B 27/002 |
| 2019/0058682 | A1 * | 2/2019 | MacAskill .......... H04L 67/1044 |
| 2020/0026342 | A1 * | 1/2020 | Sengupta ............. G06F 3/0416 |
| 2021/0127204 | A1 * | 4/2021 | Porta ................... G06V 40/166 |
| 2021/0385412 | A1 * | 12/2021 | Matula .................... H04N 7/15 |

OTHER PUBLICATIONS

Sachdeva, A., "This AI Tool Erases People From Live Webcam Feed in Real-Time", fossbytes.com, Fossbytes, online available at <https://fossbytes.com/the-people-disappearing-tool/> Feb. 25, 2020, pp. 3.

Tran, D., "Building a Real-Time Object Recognition App with Tensorflow and OpenCV", Towards Data Science, online available at <https://towardsdatascience.com/building-a-real-time-object-recognition-app-with-tensorflow-and-opencv-b7a2b4ebdc32?gi=c63a4a2c82ce>, Jun. 22, 2017, pp. 5.

Huang, H., et al., "A Modern Society and Crime Governance", China Procuratorate Press, Sep. 30, 2019, pp. 48-53.

* cited by examiner

200

302

304

500

600

REMOVAL OF MOVING OBJECTS IN VIDEO CALLS

BACKGROUND

More work is being performed remotely at home. Conference calls can be conducted to connect various people to collaborate or discuss a project, plan, review documents, and the like. The improvement of bandwidth has allowed conference calls to evolve into video calls that include video images as well as audio or voice calls. Video calls may allow speakers to see if other participants are paying attention, make it easier to present information or documents, and so forth. Thus, video calls may provide a more productive interface for communication.

DETAILED DESCRIPTION

Examples described herein provide a method and apparatus to detect and remove moving objects in a video call. As noted above, video calls can be used to improve productivity for meetings between remotely located employees. Video calls may also provide a more personable connection compared to an audio call.

However, video calls may include distractions to other participants on the video call. For example, other participants may see other people, animals, or moving objects in the live-stream video of another participant on the video call. These moving people or objects may be distracting to the viewer or embarrassing to the participant streaming the video.

The present disclosure provides a method and apparatus that can detect a moving object in the video call and remove the moving object. In an example, a proximity sensor may be used to ensure that the moving object is not the user or participant in the video call. If the distance between the user and the moving object is greater than a distance threshold, then the moving object may be removed from the video.

In an example, the video may be analyzed by a processor outside of the operating system. Thus, the video images may be analyzed quickly and efficiently and then presented to the application executing the video call within the operating system environment. This may help to reduce power consumption to improve battery life of portable devices, reduce the amount of buffering of the video frames, and so forth.

In an example, the present disclosure may also classify the moving object and monitor a distance between the moving object and a fixed location. For example, the moving object may be an animal that moves closer to the camera. When the distance between the fixed location and the moving animal is less than a distance threshold, and the moving object is identified as not being the user or participant, an action may be triggered. For example, the video may be disabled temporarily or the keyboard may be locked to prevent the moving animal (e.g., a cat or dog) from accidentally entering commands while walking on the keyboard or distracting other participants while in the video.

Figure 1:
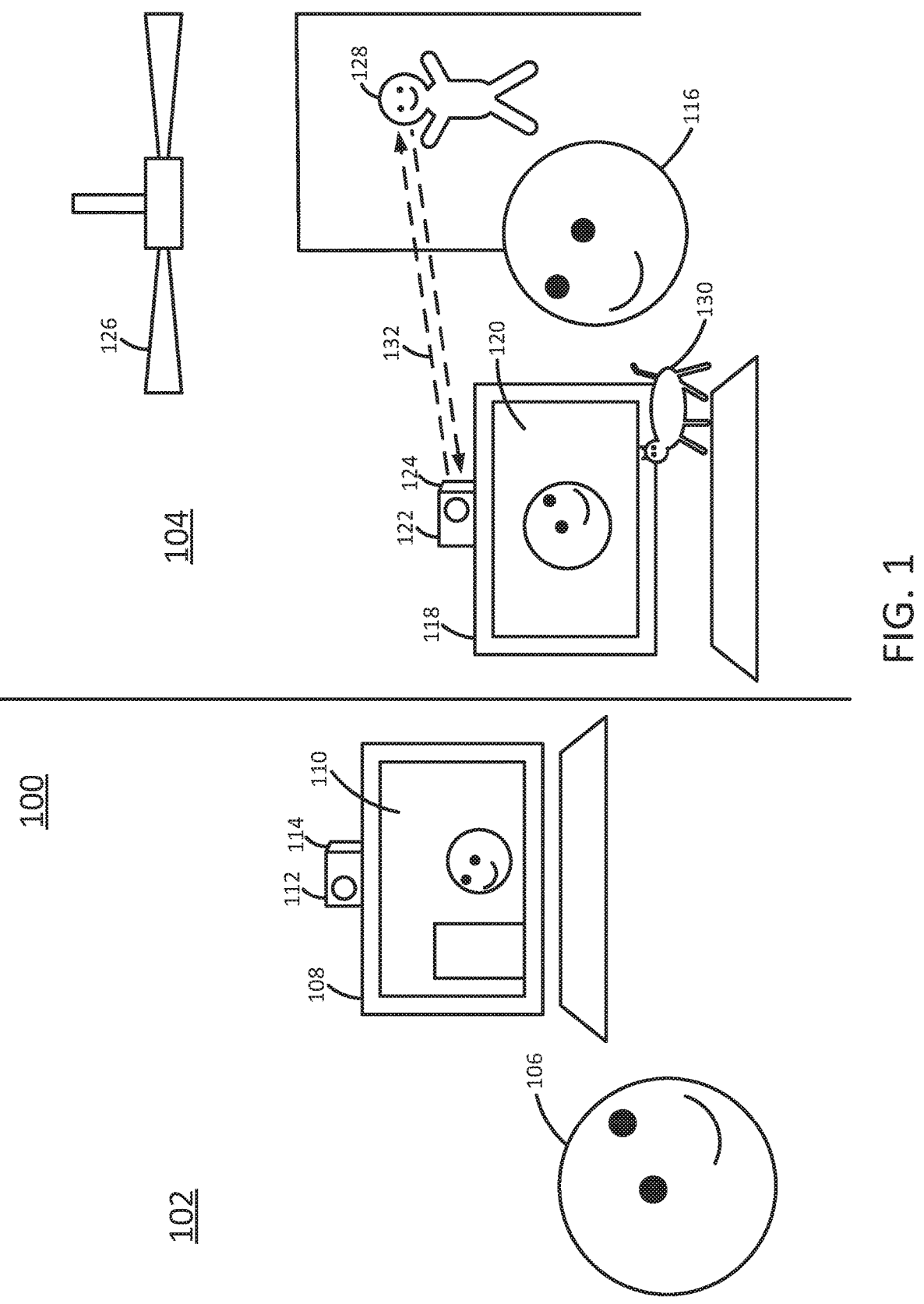
FIG. 1 is a block diagram of an example video call of the present disclosure between two participants.

FIG. 1 illustrates an example system 100 of a video call between two participants 106 and 116. FIG. 1 illustrates a first location 102 and a second location 104. The first location 102 may be remotely located from the second location 104. For example, the first location 102 may be at a different geographic location than the second location 104, or the first location 102 and the second location 104 may be different rooms/offices within the same building. The participant 106 may be conducting a video call with the participant 116. Although FIG. 1 illustrates a video call between two participants, it should be noted that the video call may be conducted with any number of participants, up to a number supported by the video call application or service.

It should also be noted that FIG. 1 has been simplified for ease of explanation. For example, the video call may be connected over an Internet protocol (IP) network that is not shown. An application server of the video call service provider located in the IP network may host the video call.

In an example, the participant 106 may use a computing device 108. The computing device 108 may include a display 110, a video camera 112, and a proximity sensor 114. The participant 116 may use a computing device 118. The computing device 118 may include a display 120, a video camera 122, and a proximity sensor 124.

The computing devices 108 and 118 may be any devices capable of conducting a video call. For example, either or both of the computing devices 108 and 118 may be a desktop computer, a laptop computer, an all-in-one (AIO) computer, a tablet computer, a mobile phone, and the like. The computing devices 108 and 118 may include additional components that are not shown. For example, the computing devices 108 and 118 may include wired or wireless communication interfaces to connect to the Internet, input devices (e.g., a keyboard, a mouse, a touch pad, and the like), microphones, and the like.

In an example, the video cameras 112 and 122 may be any type of video camera. For example, either or both of the video cameras 112 and 122 may be a red, green, blue (RGB) camera, a black and white camera, and the like. The video cameras 112 and 122 may record video images for the video call. The video images may include a series of frames. Each frame may include a plurality of pixels. The pixels within each frame over a series of frames may be analyzed to detect moving objects and remove the moving objects from subsequent frames, as discussed in further detail below.

In an example, the proximity sensors 114 and 124 may be any type of proximity sensor that can measure or calculate a distance between the location of the sensor and a location of an object. Either or both of the proximity sensors 114 and 124 may be an infrared (IR) light proximity sensor, a time-of-flight (TOF) sensor, and the like. Although shown as separate components in FIG. 1, it should be noted that the proximity sensors 114 and 124 may be incorporated as part of the video cameras 112 and 122 and/or the displays 110 and 120.

Each of the proximity sensors 114 and 124 may emit a beam of structured light or a light pulse towards an object and detect the return of the structured light. Respective processors of the computing devices 108 and 118 may know the speed of the structured light that is emitted and an amount of time between when the structured light is emitted and when the return of the structured light is detected. The processors may then calculate a distance based on these measurements.

In an example, the participant 116 at the location 104 may have moving objects 126, 128, and 130. For example, the moving object 126 may be a fan, the moving object 128 may be a child or other person, and the moving object 130 may be a pet (e.g., a cat, a dog, and the like). It should be noted that a few examples are illustrated in FIG. 1, but the moving objects can be any object, person, or animal that can move.

The moving objects 126, 128, and 130 can be a distraction for the participant 106 seeing the video of the participant 116. The present disclosure may detect certain moving objects 126, 128, and 130 and remove the moving objects from the video images shown on the display 110 of the participant 106. As shown, in FIG. 1, the moving objects 126, 128, and 130 are not shown in the display 110, despite being captured by the video camera 122 at the location 104.

In an example, the proximity sensor 124 may measure a distance of the moving objects to the proximity sensor 124 or another fixed point. For example, FIG. 1 illustrates an example of a structured light 132 being emitted towards the moving object 128. For moving objects 126 and 128 that are at a distance greater than a distance threshold, the computing device 118 may remove the moving objects 126 and 128 from the video images shown on the display 110 of the participant 106. For a moving object 130 that is at a distance less than the distance threshold, the computing device 118 may remove the object 130 and/or trigger additional actions (e.g., disabling an input device, turning off the video camera, and the like).

Figure 2:
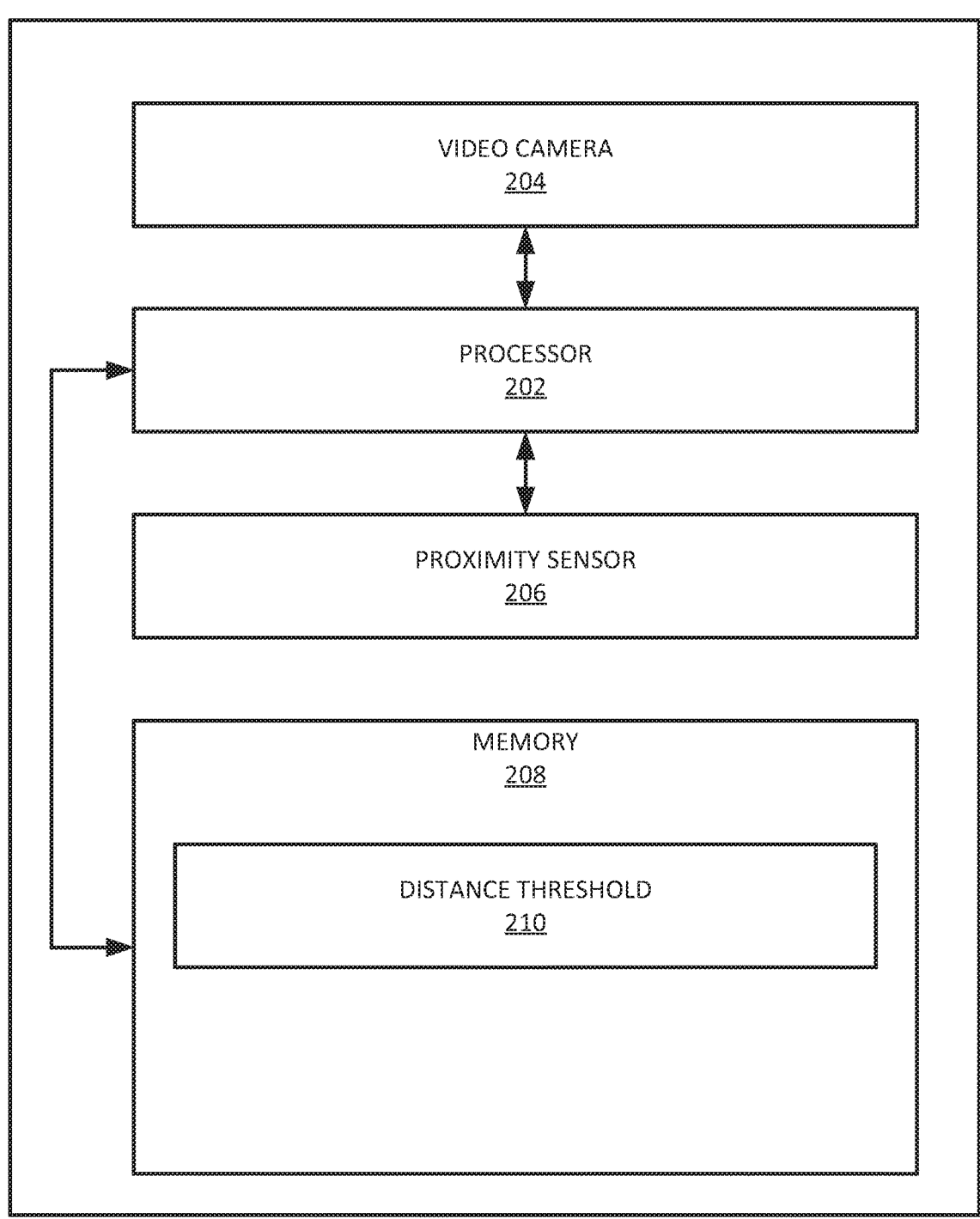
FIG. 2 is a block diagram of an example apparatus of the present disclosure to remove moving objects in video calls.

FIG. 2 illustrates an example of an apparatus 200 that can measure a distance of a moving object relative to a fixed point and take action based on the distance of the moving object. In an example, the apparatus 200 may be the computing device 108 or 118 illustrated in FIG. 1, and discussed above.

In an example, the apparatus 200 may include a processor 202, a video camera 204, a proximity sensor 206, and a memory 208. The processor 202 may be communicatively coupled to the video camera 204, the proximity sensor 206, and the memory 208. The processor 202 may control operation of the video camera 204 and the proximity sensor 206.

The video camera 204 may be similar to the video cameras 112 and 122 illustrated in FIG. 1. For example, the video camera 204 may be an RGB camera, a black and white camera, and the like. The proximity sensor 206 may be similar to the proximity sensors 114 and 124 illustrated in FIG. 1. For example, the proximity sensor 206 may be an IR light sensor, a TOF sensor, and the like, that measures distances using structured light emissions, as described above.

In an example, the memory 208 may be a non-transitory computer readable storage medium. For example, the memory 208 may be a hard disk drive, a solid state drive, a random access memory (RAM), a read-only memory (ROM), and the like. The memory 208 may store a distance threshold 210. The distance threshold 210 may be a distance that is approximately equal to a distance between the proximity sensor 206 and a location where a participant (e.g., the participant 106 and 116) is expected to sit in front of the video camera 204. For example, the distance threshold 210 may be 2 feet, 3 feet, and the like. The distance threshold 210 may be set by the participant. For example, if the participant will be standing in front of a white board away from the video camera 204, the distance threshold 210 may be set to a greater distance (e.g., 10 feet, 15 feet, and the like).

The memory 208 may also store additional information. For example, the memory 208 may store instructions executed by the processor 202 to perform the functions described herein. The memory 208 may store applications that are executed by the processor 202. For example, a video call application that uses the video images captured by the camera 204 and transmits the images between computing devices (e.g., the computing devices 108 and 118) may be stored in the memory 208.

In an example, the processor 202 may execute a video call application. For example, the video call application may transmit video images and audio between remotely located computing devices. In an example, the video call application may connect the computing devices to an application server through the Internet that is hosted by the video call service provider. The application server may receive and transmit video images and audio between the two computing devices.

The processor 202 may detect moving objects within the video images. For example, the processor 202 may detect moving objects by identifying pixels within consecutive frames of the video image that change locations or move. For example, each pixel in a first frame of a video image may be identified and/or labeled based on a characteristic of a pixel (e.g., a color value of the pixel, an illumination value of the pixel, and the like). A pixel may be tracked between consecutive frames of video images based on characteristics of the pixel.

A velocity of each pixel may be calculated by measuring a distance an identified pixel has moved between consecutive frames of the video image of a video call. Pixels that have a velocity greater than zero may be identified as pixels associated with a moving object. To illustrate, a pixel at location $(x, y)$ in a first frame of the video image may have a first color value. The pixel with the same color value may be found in the second frame of the video image at the location $(x+1, y+1)$. The pixel may have moved a distance of $+1$ between the timespan associated with consecutive frames of the video image and have a velocity that is greater than zero. Thus, the pixel may be associated with a moving object.

A second pixel at location $(x_2, y_2)$ in a first frame of the video image may have a second color value. The second pixel with the same color value may be found at the same location $(x_2, y_2)$ in a second frame of the video image. Thus, the second pixel may have moved a distance of zero between the timespan associated with the consecutive frames of the video image and have a velocity of zero. Thus, the second pixel may not be associated with a moving object.

In an example, a group of pixels can be grouped into a profile based on common characteristics (e.g., pixels with the same color or illumination value). The profile of the group of pixels can be analyzed from frame to frame to determine if an object has moved based on different locations of identified pixels between consecutive frames of video images. The pixels that have moved may be associated with a moving object. Other techniques may also be used to detect moving objects within consecutive frames of video images.

In some examples, the profile of the group of pixels may be identified as a user or non-user moving object. In an example, the memory 208 may store an image of a user. For example, the image may be captured for facial recognition to unlock the computing device. If the group of pixels matches the image of the user, then the group of pixels may be identified as the user. If the group of pixels does not match the image of the user, then the group of pixels may be identified as a non-user moving object. The profile of the group of pixels associated with the moving object may be used to trigger additional actions based on a distance of the moving object, as discussed in further details below.

The processor 202 may determine that the moving object is located at a distance greater than the distance threshold 210. For example, the proximity sensor 206 may measure the distance of the moving object, as described above. The processor 202 may then remove the moving object from the video images.

In an example, the processor 202 may remove the moving object using any available technique to remove moving objects from a sequence of video frames or images. For example, the moving objects may be removed by replacing the pixels of the moving objects with static pixels. For example, approximate colors of pixels adjacent to the moving object may be used to replace the moving object. Thus, pixels of a fan on a white ceiling may be replaced with white pixels of the ceiling, a moving person in a dark doorway may be replaced with black pixels of the dark doorway, and so forth. Thus, when the recipient participant receives the transmitted video images on his or her display, the video images may be shown without the moving objects.

Figure 3:
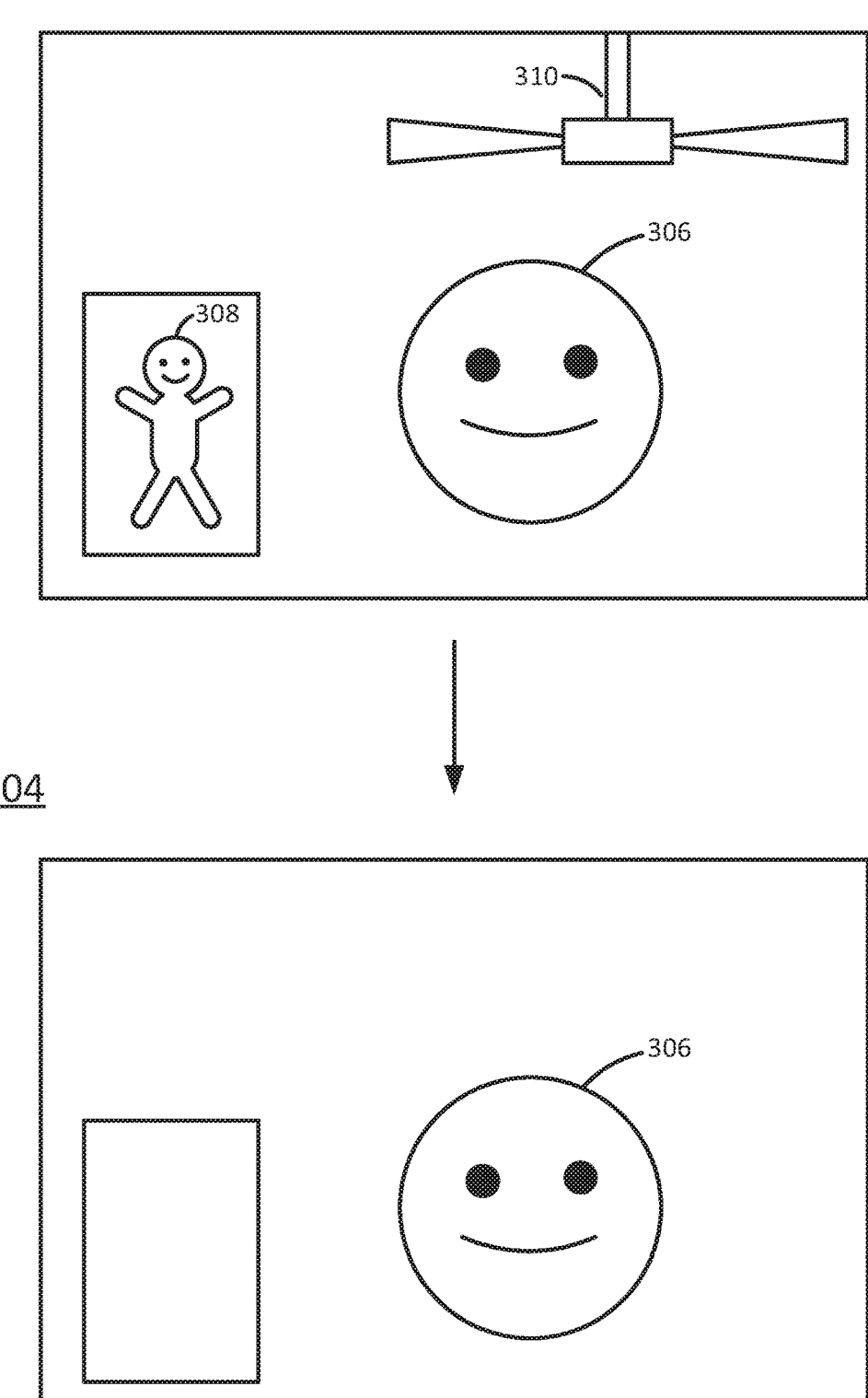
FIG. 3 is a block diagram of an example before and after video image during a video call of the present disclosure.

FIG. 3 illustrates an example of a before and after video image with moving objects removed during a video call of the present disclosure. The video image 302 may illustrate an example of the video image captured by the video camera 204. For example, a user 306 may be sitting in front of the video camera 204 on a video call. However, during the video call, the video camera 204 may capture a person 308 walking past the user 306 and a moving fan 310.

As described above, the frames of the video images may be analyzed to detect the person 308 that is moving behind the user 306 and the moving fan 310. The proximity sensor 206 may measure a distance of the person 308 and a distance of the moving fan 310. The processor 202 may compare the distances to the distance threshold 210. The distance of the person 308 and the distance of the moving fan 310 may be greater than the distance threshold 210. As a result, the processor 202 may remove the person 308 and the moving fan 310 from subsequent video images.

A video image 304 illustrates an example of the video image 302 after the moving person 308 and the moving fan 310 are removed. For example, the video image 304 shows the user 306, but does not show the person 308 or the moving fan 310. The video image 304 may be the video image that is transmitted to the remote computing device and/or to the application server of the video call service provider to be then forwarded to the remote computing device of the other participants on the video call.

As discussed above, the distance to some moving objects may be less than the distance threshold 210. For example, a cat may walk across the desk in front of the user 306. Some moving objects for which the distance is less than the distance threshold 210 may accidently step on the keyboard, move the mouse, or accidentally interact with other input devices of the apparatus 200.

In an example, if the profile of the moving object to which the distance is less than the distance threshold 210 is not the user, then additional actions may be triggered. For example, the input devices may be disabled to prevent the moving object from accidentally transmitting unwanted messages, documents, and the like. In another example, the action may be to temporarily disable the video camera until the moving object can be removed from the front of the video camera 204. In another example, the moving object can be removed in combination with the other actions (e.g., removing the moving object from the video images as well as disabling the input devices).

Once the moving object is moved out of view of the video camera 204, the other actions may be reversed or discontinued. For example, the video camera 204 may be reactivated and/or the input devices may be reactivated. In an example, a prompt may be displayed to allow the user 306 to confirm that the moving object has been moved out of view to undo the actions.

In an example, the distance of the moving object may be continuously tracked. For example, the person 308 (e.g., a child) may start at a distance greater than the distance threshold 210. However, the person 308 may continue moving closer to the user 306 towards the video camera 204. As the person 308 moves to a distance that is less than the distance threshold 210, the apparatus 200 may automatically disable the input devices and/or the video camera 204. For example, the person 308 may be a child that runs up to the apparatus 200 to accidentally type on the keyboard or a person intentionally moving towards the video camera 204 to be a distraction while the user 306 is on the video call. Thus, by continuously tracking the distances of the moving objects that are detected, these scenarios can be prevented.

Referring back to FIG. 2, in an example, the processor 202 may be an artificial intelligence (AI) processor that operates outside of the operating system (OS) of the apparatus 200. For example, the processor 202 may receive video images from the video camera 204, analyze the video images to detect moving objects, and remove the moving objects from the video images outside of the functionality of the OS. The processed images may then be provided to the OS and the application being executed within the OS environment. As a result, fewer frames of the video images may be buffered. This may allow the processor 202 to process the video images more efficiently. In addition, this may reduce overall power consumption, which may lead to improved battery life for apparatuses that are battery powered.

Figure 4:
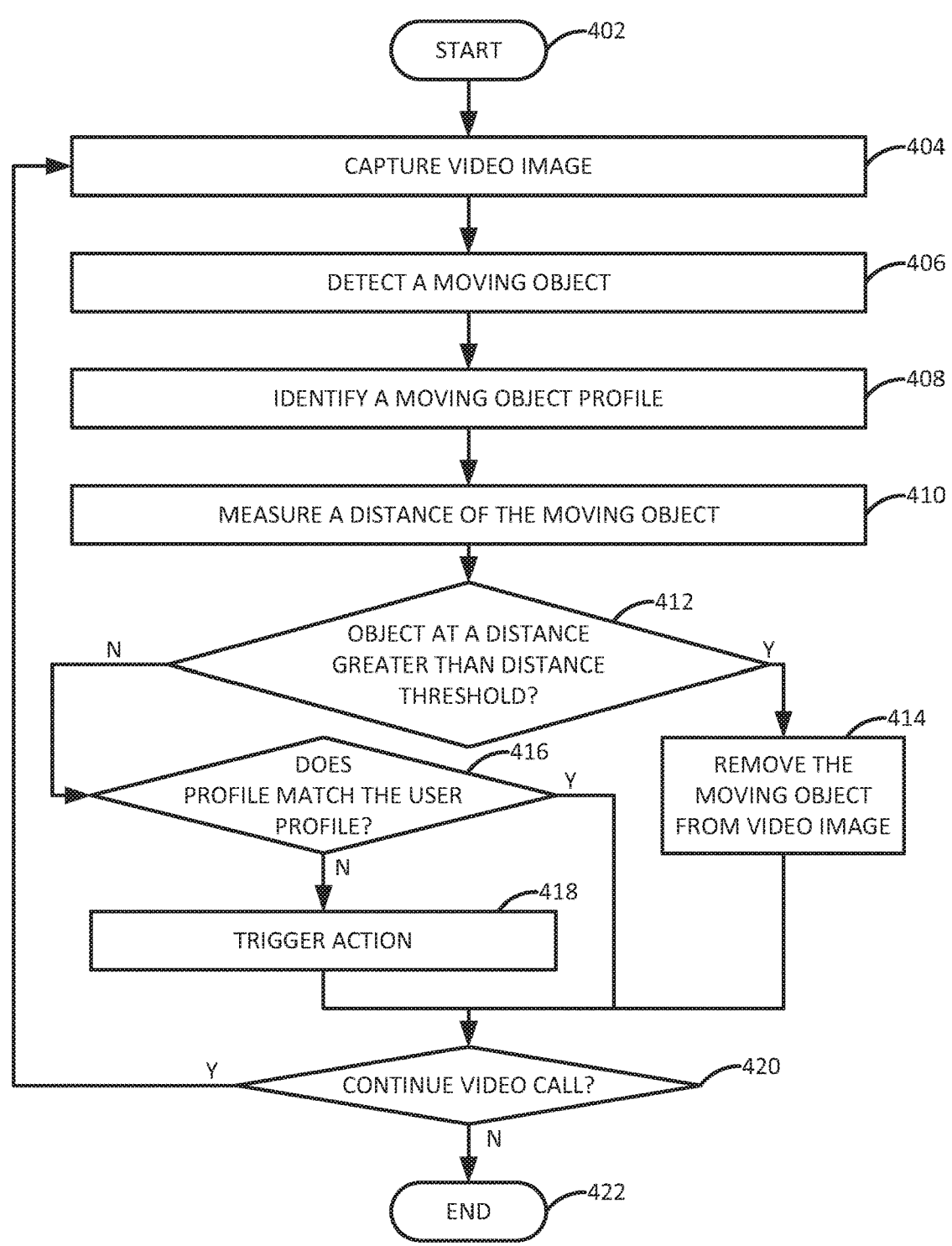
FIG. 4 is an example flow diagram of a method for performing an action in response to a trigger caused by a moving object detected in a video call of the present disclosure.

FIG. 4 illustrates a flow diagram of an example method 400 for performing an action in response to a trigger caused by a moving object detected in a video call of the present disclosure. In an example, the method 400 may be performed by one of the computing devices 108 or 118 illustrated in FIG. 1, the apparatus 200 illustrated in FIG. 2, the apparatus 500 illustrated in FIG. 5 and described below, or the apparatus 600 illustrated in FIG. 6, and described below.

At block 402, the method 400 begins. At block 404, the method 400 captures a video image. For example, the video image may be captured by a video camera. The video image may include a plurality of video images or frames. Each frame of video may include a plurality of pixels.

At block 406, the method 400 may detect a moving object. For example, the pixels in each frame of the video image may be analyzed to detect the moving object. Movement of pixels may be detected between consecutive frames of the video image (e.g., identified pixels having a particular characteristic at different locations within two consecutive frames of a video image). In an example, the velocity of movement for each pixel may be calculated between consecutive frames. Any pixel with a velocity greater than zero may be determined to be a pixel representing a moving object. In some examples, more than one moving object may be detected within the video image.

At block 408, the method 400 may identify a moving object profile. For example, the moving object profile may be determined based on a size and shape of a group of pixels that are identified as part of the moving object. The size and shape may be compared to pre-determined sizes and shapes to identify the profile. The profile may determine if the moving object is a human being, an animal, a particular type of object, and the like.

In an example, the moving object profile may be classified as either being a user profile or a non-user profile. For example, the image formed by the pixels of the moving object may be compared to an image of the user. If the image of the pixels matches the image of the user, then the moving object profile may be determined to be a user profile. If the image of the pixels do not match the image of the user, then the moving object profile may be determined to be a non-user profile.

At block 410, the method 400 may measure a distance of the moving object. For example, a proximity sensor may emit a pulsed light or beam of structured light to measure the distance of the moving object from the proximity sensor.

At block 412, the method 400 may determine if the object is at a distance greater than the distance threshold. If the answer to block 412 is yes, then the method 400 may proceed to block 414.

At block 414, the method 400 may remove the moving object from the video image. Any type of method or technique may be used to remove the moving object. For example, static pixels of adjacent objects to the moving object may be used to replace the pixels of the moving object. The method 400 may then proceed to block 420.

Referring back to block 412, if the answer is no, then the method 400 may proceed to block 416. At block 416, the method 400 determines if the moving object profile matches the user profile. If the answer to block 416 is yes, the method 400 may proceed to block 420. For example, the moving object that is detected is the user. Thus, no action is triggered.

If the answer to block 416 is no, then the method 400 may proceed to block 418. At block 418, the method 400 may trigger an action. For example, the moving object may have moved too close to the video camera and/or computing device of the user. In addition, the moving object is not the user. As a result, the method 400 may automatically trigger an action, such as disabling an input device (e.g., a keyboard, mouse, trackpad, a microphone, and the like), disabling the video camera, and the like.

The action may be triggered temporarily. For example, the user may be prompted to press a key when the moving object has been moved away or out of view of the video camera. Then, the action may be removed or reversed. For example, the input device may be reactivated, the video camera may be reactivated, and the like.

At block 420, the method 400 may determine if the video call is continuing. If the answer is yes, the method 400 may return to block 404 to continue capturing video images, and the method 400 may be repeated. If the answer is no, the method 400 may proceed to block 422. At block 422, the video call may be terminated and the method 400 ends.

Figure 5:
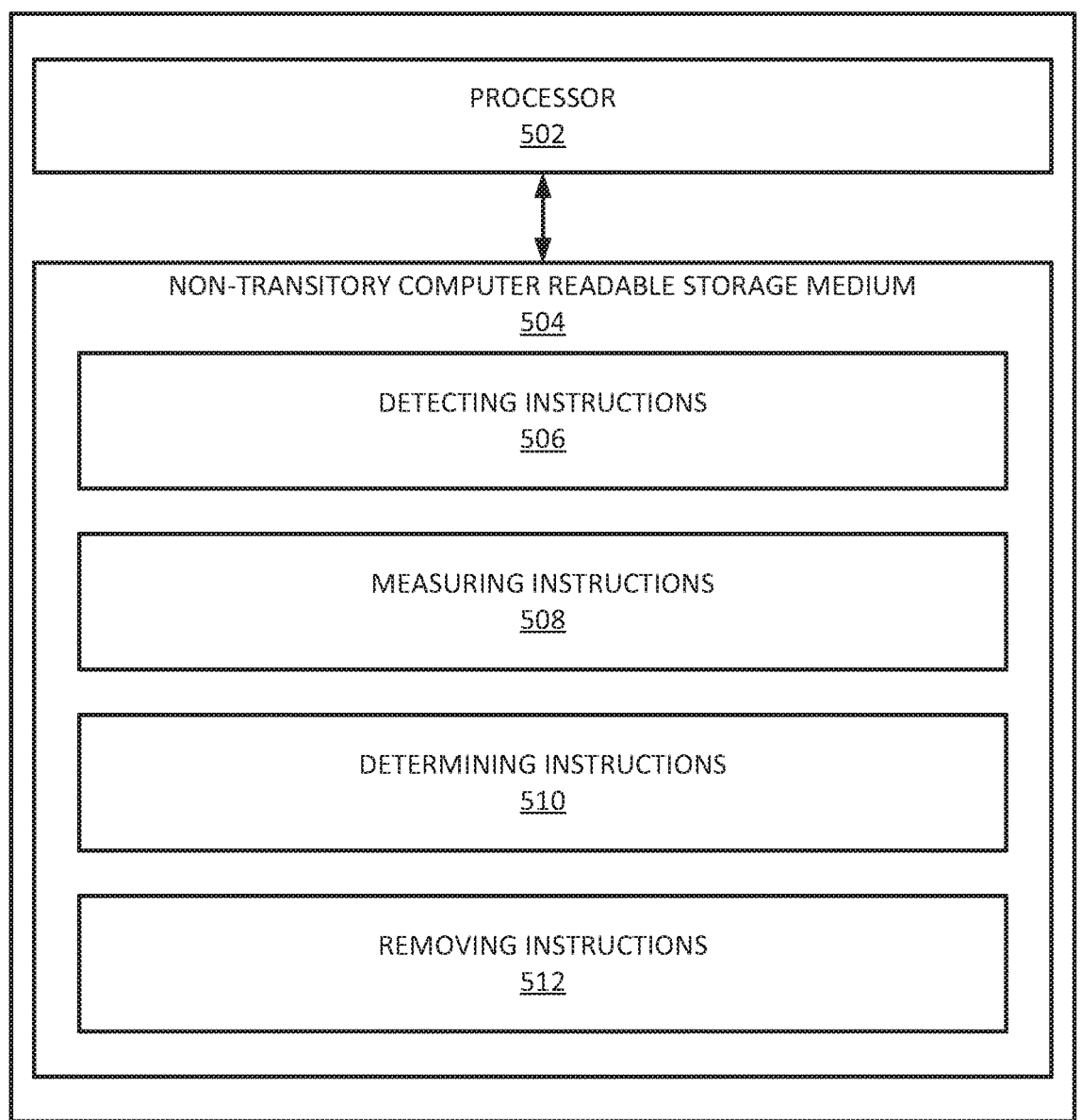
FIG. 5 is an example non-transitory computer readable storage medium storing instructions executed by a processor to remove a moving object in a video call that is located at a distance greater than a distance threshold of the present disclosure.

FIG. 5 illustrates an example of an apparatus 500. In an example, the apparatus 500 may be one of the apparatuses 106 or 108. In an example, the apparatus 500 may include a processor 502 and a non-transitory computer readable storage medium 504. The non-transitory computer readable storage medium 504 may be encoded with instructions 506, 508, 510, and 512 that, when executed by the processor 502, cause the processor 502 to perform various functions.

In an example, the instructions 506 may include detecting instructions 506. For example, the instructions 506 may detect a moving object within a video image of a video call.

The instructions 508 may include measuring instructions. For example, the instructions 508 may measure a distance of the moving object from a video camera that is capturing the video image. The distance may be measured with a proximity sensor.

The instructions 510 may include determining instructions. For example, the instructions 510 may determine that the distance of the moving object from the video camera is greater than a distance threshold.

The instructions 512 may include removing instructions. For example, the instructions 512 may remove the moving object from the video image in the video call.

Figure 6:
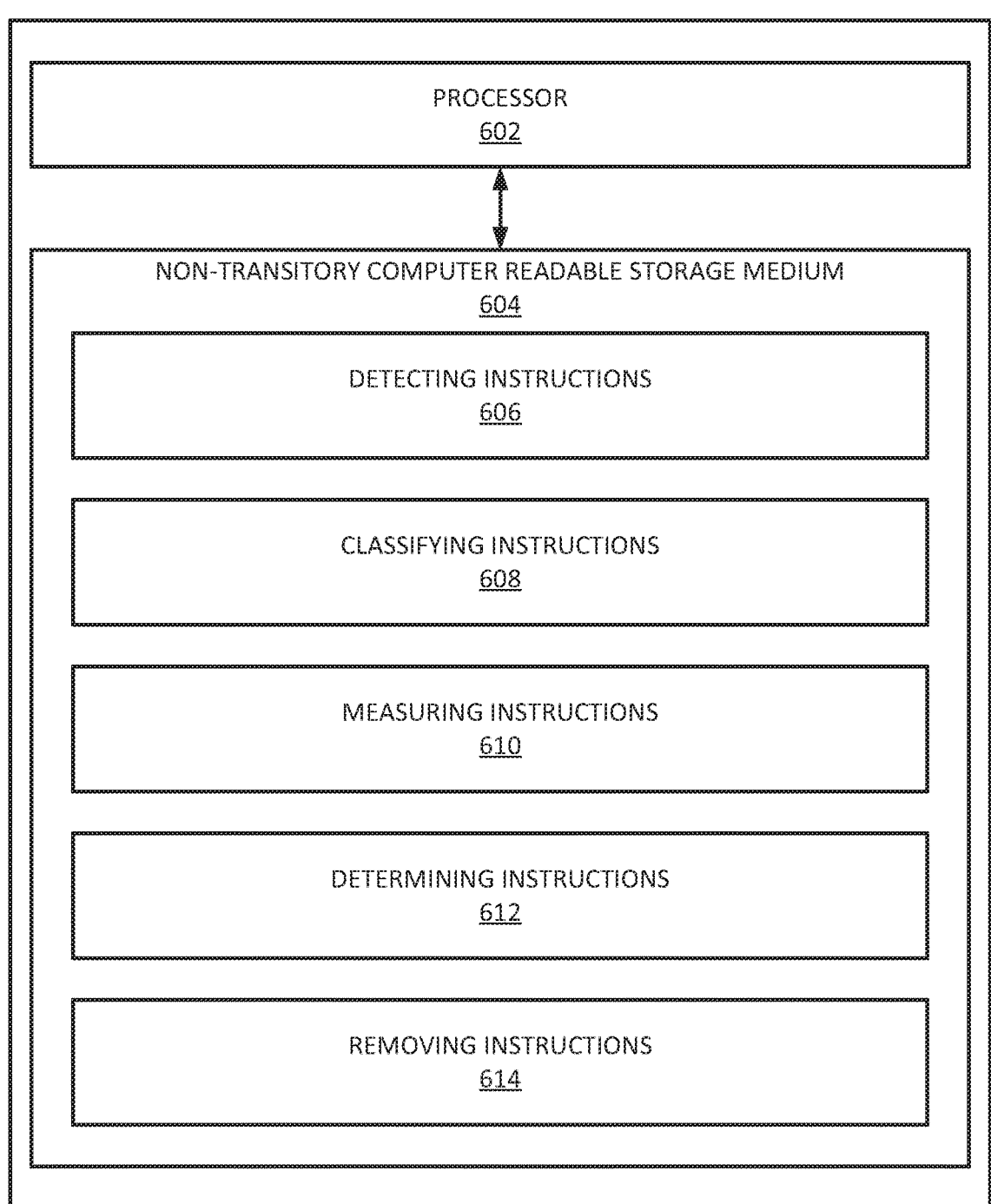
FIG. 6 is an example non-transitory computer readable storage medium storing instructions executed by a processor to perform an action in response to detecting a moving object is located at a distance less than a distance threshold of the present disclosure.

FIG. 6 illustrates an example of an apparatus 600. In an example, the apparatus 600 may be one of the apparatuses 106 or 108. In an example, the apparatus 600 may include a processor 602 and a non-transitory computer readable storage medium 604. The non-transitory computer readable storage medium 604 may encoded with instructions 606, 608, 610, 612, and 614 that, when executed by the processor 602, cause the processor 602 to perform various functions.

In an example, the instructions 606 may include detecting instructions 606. For example, the instructions 606 may detect a moving object within a video image of a video call.

The instructions 608 may include classifying instructions. For example, the instructions 608 may classify the moving object as a non-user moving object. For example, the image of the moving object maybe compared to an image of a user. If the image of the moving object does not match the image of the user, the moving object may be classified as a non-user moving object.

The instructions 610 may include measuring instructions. For example, the instructions 610 may measure a distance of the moving object from a video camera that is capturing the video image. In an example, a proximity sensor may be used to measure the distance of the moving object.

The instructions 612 may include determining instructions. For example, the instructions 612 may determine that the distance of the moving object from the video camera is less than a distance threshold.

The instructions 614 may include removing instructions. For example, the instructions 614 may remove the moving object from the video image in the video call and execute an action in response to the distance of the moving object being less than the distance threshold and the moving object being classified as the non-user moving object. In an example, an action may be triggered in addition to removing the object from the video image when the moving object is less than the distance threshold. For example, an input device may be disabled, the video camera may be disabled, and the like. The action may be triggered temporarily until the moving object is moved away from the video camera.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a video camera to capture video images;
a proximity sensor to measure a distance of a moving object from the video camera; and
a processor communicatively coupled to the video camera and the proximity sensor, the processor to:
execute a video call application;
detect the moving object within the video images transmitted by the video call application;
classify the moving object as a user or non-user;
determine a distance from the moving object to the video camera is greater than a distance threshold, the distance threshold being changeable by the user;
responsive to a determination that the distance from the moving object to the video camera is greater than the distance threshold and the moving object is classified as the non-user, remove the moving object from the video images transmitted by the video call application; and
responsive to a determination that the distance from the moving object to the video camera is less than the distance threshold and the moving object is classified as the non-user, remove the moving object from the video images transmitted by the video call and perform an additional action.

2. The apparatus of claim 1, further comprising:
a memory to store the distance threshold.

3. The apparatus of claim 1, wherein the processor is a dedicated video image processor to execute instructions outside of an operating system of the apparatus.

4. The apparatus of claim 1, wherein the proximity sensor comprises an infrared sensor to measure the distance from the moving object to the video camera.

5. The apparatus of claim 1, wherein the proximity sensor comprises a time-of-flight (TOF) sensor to measure the distance from the moving object to the video camera.

6. A non-transitory computer readable storage medium encoded with instructions which, when executed, cause a processor of an apparatus to:
detect a moving object within a video image of a video call;
measure a distance of the moving object from a video camera that captures the video image;
determine that the distance of the moving object from the video camera is greater than a distance threshold, the distance threshold being changeable by a user;
classify the moving object as the user or a non-user;
responsive to determining that the distance of the moving object from the video camera is greater than the distance threshold and the moving object is the non-user, remove the moving object from the video image in the video call; and
responsive to determining that the distance of the moving object from the video camera is less than the distance threshold and the moving object is the non-user, remove the moving object from the video image and take an additional action, the additional action comprising disabling a keyboard.

7. The non-transitory computer readable storage medium of claim 6, wherein to detect the moving object further comprises causing the processor to:
calculate a velocity of each pixel within consecutive video images of the video call; and determine pixels that have a velocity greater than zero.

8. The non-transitory computer readable storage medium of claim 6, wherein to measure the distance, comprises causing the processor to:
emit a light pulse at the moving object by a proximity sensor;
measure an amount of time for the light pulse to return to the proximity sensor; and
calculate the distance based on an amount of time and a known velocity of the light pulse.

9. The non-transitory computer readable storage medium of claim 6, further comprising causing the processor to:
continuously track the distance from the moving object to the video camera; and
the additional action further comprises disabling the video camera when the distance from the moving object to the video camera is less than the distance threshold.

10. A non-transitory computer readable storage medium encoded with instructions which, when executed, cause a processor of an apparatus to: detect a moving object within a video image of a video call; classify the moving object as a non-user moving object; measure a distance of the moving object from a video camera that captures the video image; classify the moving object as a user or non-user; responsive to a determination that the distance of the moving object from the video camera is less than a distance threshold, and the moving object is classified as the non-user, remove the moving object from the video image in the video call and execute an action; and responsive to a determination that the distance from the moving object to the video camera is greater than the distance threshold, and the moving object is classified as the non-user, remove the moving object from the video image and perform an additional action.

11. The non-transitory computer readable storage medium of claim 10, wherein the moving object is classified based on a size and shape of a profile of a group of pixels that is moving.

12. The non-transitory computer readable storage medium of claim 10, wherein the moving object is classified based on a comparison to a facial image of the user.

13. The non-transitory computer readable storage medium of claim 10, wherein the action is to disable input devices connected to the apparatus, the input devices comprising a keyboard.

14. The non-transitory computer readable storage medium of claim 10, wherein the action is to disable the video camera.

15. The apparatus of claim 1, wherein the processor is an artificial intelligence (AI) processor.

16. The non-transitory computer readable storage medium of claim 6, wherein the instructions further cause the processor to keep the moving object in the video image in the video call in response to a profile of the moving object matching a profile of the user.

17. The non-transitory computer readable storage medium of claim 10, wherein the instructions further cause the processor to remove the moving object from the video image in the video call by replacing pixels of the moving object with static pixels.

18. The non-transitory computer readable storage medium of claim 10, wherein the instructions cause the processor to classify the moving object as the non-user moving object by comparing a moving object profile to a user profile.

19. The non-transitory computer readable storage medium of claim 10, wherein the instructions cause the processor to classify the moving object as the non-user moving object by comparing pixels of a moving object to an image of the user, the user image being captured for facial recognition to unlock a computing device.

\* \* \* \* \*